United States Patent
Simon et al.

(10) Patent No.: US 11,025,079 B2
(45) Date of Patent: Jun. 1, 2021

(54) DEVICE WITH ELECTRIC LOAD

(71) Applicant: Endress+Hauser Flowtec AG, Reinach (CH)

(72) Inventors: Antoine Simon, Saint-Louis (FR);
Markus Rüfenacht, Diepflingen (CH);
Ronald Wicki, Breitenbach (CH)

(73) Assignee: Endress+Hauser Flowtec AG, Reinach (CH)

( * ) Notice: Subject to any disclaimer, the term of this patent is extended or adjusted under 35 U.S.C. 154(b) by 0 days.

(21) Appl. No.: 16/499,565

(22) PCT Filed: Mar. 21, 2018

(86) PCT No.: PCT/EP2018/057182
§ 371 (c)(1),
(2) Date: Sep. 30, 2019

(87) PCT Pub. No.: WO2018/177845
PCT Pub. Date: Oct. 4, 2018

(65) Prior Publication Data
US 2020/0044470 A1 Feb. 6, 2020

(30) Foreign Application Priority Data
Mar. 30, 2017 (DE) .................... 10 2017 106 836.8

(51) Int. Cl.
*H02J 7/00* (2006.01)
*G01F 1/58* (2006.01)
(Continued)

(52) U.S. Cl.
CPC ............ *H02J 7/0063* (2013.01); *G01F 1/586* (2013.01); *G01F 1/588* (2013.01); *G06F 1/263* (2013.01);
(Continued)

(58) Field of Classification Search
CPC .......... H02J 7/0063; H02J 7/0024; H02J 7/34; H02J 2007/0067; G01F 1/586; G01F 1/588; G06F 1/263
See application file for complete search history.

(56) References Cited

U.S. PATENT DOCUMENTS

| 2005/0062455 A1* | 3/2005 | Stavely | ............... | H02J 7/00047 |
| | | | | 320/106 |
| 2005/0280397 A1* | 12/2005 | Iwamoto | ................ | H04N 5/232 |
| | | | | 320/132 |
| 2010/0280694 A1* | 11/2010 | Noiret | ................... | B60W 20/10 |
| | | | | 701/22 |

FOREIGN PATENT DOCUMENTS

| DE | 19644955 A1 | 5/1997 |
| DE | 19934708 A1 | 2/2001 |

(Continued)

*Primary Examiner* — Hal Kaplan
*Assistant Examiner* — Thai H Tran
(74) *Attorney, Agent, or Firm* — Kelly J. Smith; Endress+Hauser (USA) Holding Inc.

(57) ABSTRACT

The present disclosure relates to a device with an electric load and a replaceable electric energy store. The energy store has at least one first storage unit with a first initial energy quantity and at least one second storage unit with a second initial energy quantity, wherein an electronic circuit is designed to actuate the first storage unit or the second storage unit according to an algorithm. By actuating the first storage unit or the second source unit, the energy supply of the device is ensured by the respective storage unit, and by actuating the first storage unit or the second storage unit, it is ensured that when a remaining energy quantity or an applied energy quantity of one storage unit is low, the respective other storage unit has a remaining energy quantity of at least 10% of a total energy quantity.

13 Claims, 5 Drawing Sheets

(51) Int. Cl.
*G06F 1/26* (2006.01)
*H02J 7/34* (2006.01)
(52) U.S. Cl.
CPC .............. *H02J 7/0024* (2013.01); *H02J 7/34* (2013.01); *H02J 2007/0067* (2013.01)

(56) References Cited

FOREIGN PATENT DOCUMENTS

| | | |
|---|---|---|
| DE | 102008040524 A1 | 1/2010 |
| DE | 102010003995 A1 | 7/2011 |
| DE | 102012208349 A1 | 11/2013 |
| DE | 102015103580 A1 | 9/2016 |
| EP | 2099112 A3 | 1/2013 |
| JP | 1125812 A | 9/1999 |
| JP | 11252812 A | 9/1999 |

\* cited by examiner

DEVICE WITH ELECTRIC LOAD

CROSS-REFERENCE TO RELATED APPLICATIONS

The present application is related to and claims the priority benefit of German Patent Application No. 10 2017 106 836.8, filed on Mar. 30, 2017 and International Patent Application No. PCT/EP2018/057182 filed on Mar. 21, 2018, the entire contents of which are incorporated herein by reference.

TECHNICAL FIELD

The invention relates to a device having an electric load and a replaceable electric energy store.

BACKGROUND

Devices in accordance with the state of the art which are operated with an energy store and are used in critical applications require a measure for a state of charge of the energy store so that the energy store can be replaced before it is completely empty, so that the application is not impaired.

For example, such a device can be a battery-operated flow meter, and, in particular, a battery-operated magnetic-inductive flow meter; see, for example, document DE 102015103580 A1.

The measure for the state of charge in this case is, for example, the charging voltage of the energy store. In energy stores in which the charging voltage is almost constant over wide state of charge ranges within the scope of a measuring accuracy of the charging voltage, coulomb counters are used to measure the energy consumed in order to achieve a sufficient measuring accuracy of the state of charge.

However, measuring the charging voltage or measuring the consumed energy itself is associated with a certain energy consumption, which results in a disruptive reduction of a service life of the energy store in the case of devices with low energy consumption.

Furthermore, the estimation of a remaining service life of the energy store due to measurement errors of the charging voltage or of measurement errors of the already consumed energy itself is subject to great uncertainties. Also, in the case of Coulomb counters for estimating the remaining service life, an initial energy quantity of the energy store must be known, wherein the initial energy quantity itself is an only inexactly known value due to production-related uncertainties.

SUMMARY

The aim of the invention is therefore to propose a device with a replaceable energy store in which the disadvantages mentioned are at least reduced.

The aim is achieved by a device according to the invention in accordance with independent claim 1.

A device according to the invention comprises at least one electric load;

at least one replaceable electric energy store;

an electronic measuring/operating circuit for operating the load and for controlling power management of the electronic device, wherein the energy store has at least one first storage unit with a first initial energy quantity and at least one second storage unit with a second initial energy quantity, wherein the electronic measuring/operating circuit is configured to actuate the first storage unit or the second storage unit according to an algorithm, wherein it is ensured that energy is supplied to the device by the respective storage unit by actuating the first or second storage unit, wherein the electronic measuring/operating circuit is configured to ensure, by actuating the first storage unit or the second storage unit, that the respective other storage unit has a residual energy quantity of at least 10% and, in particular, at least 20% and preferably at least 30% of a total energy quantity of the first initial energy quantity of the first storage unit and the second initial energy quantity of the second storage unit in the case of a low residual energy quantity or a consumed energy quantity of a storage unit.

By configuring at least two storage units and actuating the storage units according to an algorithm which ensures that the at least one other storage unit has at least 10% of the total energy quantity when the energy quantity of a storage unit is used up, an error-prone measurement of the state of charge of the energy store by means of charge voltage measurement or energy consumption measurement by coulomb counters can be avoided. Furthermore, an overall service life of the energy store increases due to the avoidance of the operation of a state-of-charge measurement. This is particularly important in devices with low consumption and long running time.

Without restricting generality, devices according to the invention can, for example, be field devices for industrial process, measurement, and automation technology, devices for environmental measurement technology, laboratory measurement technology, traffic monitoring technology, medical technology, in particular, implants, building automation technology, or communications technology.

Devices according to the invention have, in particular, a power consumption which, for a given total energy quantity, is an operating period without an energy store change of not less than 1 month, and, in particular, not less than 6 months and, for example, not less than 2 years.

The average power consumption is at least 0.2 mW, and, in particular, at least 2 mW and, for example, at least 20 mW, and/or at most 1 Watt, and, in particular, at most 250 mW and, for example, at most 100 mW.

In one embodiment, the electronic measuring/operating circuit is designed to output a warning signal as soon as the residual energy quantity of a storage unit is low or as soon as the initial energy quantity of a storage unit is used up, wherein the electronic measuring/operating circuit is designed to ensure that energy is supplied to the device by continuously using the respective other storage unit in the case of a low residual energy quantity or a used-up energy quantity of a storage unit.

By outputting a warning signal and continuously using the storage unit with an amount of energy that is not completely used up, there remains enough time for the user of the device to take care of the replacement of the energy store.

In one embodiment, the type of energy store is a type from the following list:

accumulator, primary battery, wherein the primary battery is, in particular, an alkaline primary battery and preferably a lithium primary battery.

In particular, alkaline primary batteries have a charge voltage largely independent of the state of charge, so that, when using alkaline primary batteries, disadvantageous coulomb counters are used for monitoring the state of charge.

However, the substantial independence of the charging voltage from the state of charge is of particular advantage for the use of devices with an electric load, since a stable operation of the devices is thus ensured.

In one embodiment, the first storage unit and the second storage unit each comprise one or more storage elements of the same type.

In this way, an energy store can be assembled in a favorable and simple manner. Moreover, in the case of storage elements of the same type, it can be assumed that a discharging behavior and an initial energy quantity are similar. A storage element may be, for example, a lithium primary battery with an initial energy quantity of X Watt hours. In a first storage unit with a storage elements and a second storage unit with b storage elements, an energy store thus has an initial total energy quantity of (a+b)*X Watt hours, wherein a and b are natural numbers, and X is a real number greater than zero.

a and b are less than 20, and, in particular, less than 10 and preferably less than 5.

X is more than 2 Wh, and, in particular, more than 5 Wh and preferably more than 10 Wh, and/or less than 1,000 Wh, and, in particular, less than 200 Wh and preferably less than 30 Wh.

In one embodiment, the first storage unit and the second storage unit of the energy store are combined spatially to form a storage module.

This ensures that aging of the storage elements proceeds in a similar manner due to the same conditions. This is advantageous during the operation of the device and also during storage of the energy store before final manufacture of the device.

In one embodiment, the algorithm comprises at least one first time period for actuating the first storage unit and at least one second time period for actuating the second storage unit. In this way, the storage units can be actuated in such a way that, when a storage unit is completely emptied, the at least one other storage unit has a sufficiently large residual energy quantity to enable a timely exchange of the energy store.

In one embodiment, the first time period and the second time period are more than 100 milliseconds, in particular, more than 1 minute and preferably more than 1 hour, and/or wherein the first time period and the second time period are less than 3 months and, in particular, less than 1 month and preferably less than 1 week.

In one embodiment, the first time period and the second time period are more than 0.001% and, in particular, more than 0.005% and preferably more than 0.02% of an overall service life of the energy store, and/or wherein the first time period and the second time period are less than 10% and, in particular, less than 5% and preferably less than 2% of the total service life.

Disruptive effects of the switching and possible additional energy consumption due to the switching can be reduced by a minimum duration of the first or second time period.

Complete emptying of a storage unit prior to the expiration of a first or second time period can be avoided by a maximum duration of the first or second time period.

The first or the second time period does not necessarily have to be constant, but may be dependent, for example, upon a load state of the device. Thus, the first and the second time periods can be shorter in the case of high load.

In one embodiment, a first ratio $V1=E1/E2$ of the first initial energy quantity to the second initial energy quantity is greater than or equal to 1, and wherein, for a second ratio $V2=t1/t2$ of the first time period to the second time period, $V2=V1*F$ applies, with either F being less than 1 and, in particular, less than 0.9 and preferably less than 0.8, or F being more than 1 and, in particular, more than 1.1 and preferably more than 1.2, wherein the electronic measuring/operating circuit is configured to alternately actuate the first storage unit and the second storage unit.

This ensures that the first storage unit and the second storage unit are actuated asymmetrically in such a way that either the first storage unit or the second storage unit is emptied first. With F more than 1, the first storage unit is emptied first, and with F less than 1, the second storage unit is emptied first.

In one embodiment, a first ratio $V1=E1/E2$ of the first initial energy quantity to the second initial energy quantity is greater than or equal to 1, wherein the electronic measuring/operating circuit is designed to configure the sequence of actuation of the first storage unit and of the second storage unit essentially randomly, wherein the actuation of the first storage unit has an average first actuation time, and wherein the actuation of the second storage unit has an average second actuation time, wherein, for a third ratio V3 of the average first actuation time to the average second actuation time, $V3=V1*F$ applies, with either F being less than 1 and, in particular, less than 0.9 and preferably less than 0.8, or F being more than 1 and, in particular, more than 1.1 and preferably more than 1.2.

This ensures that the first storage unit and the second storage unit are actuated asymmetrically in such a way that either the first storage unit or the second storage unit is emptied first. With F more than 1, the first storage unit is emptied first, and with F less than 1, the second storage unit is emptied first.

In one embodiment, the device is a field device for measurement and automation technology, wherein the at least one electric load is a sensor for detecting at least one measurand, wherein the device also comprises:

a housing having at least one housing chamber, wherein the energy store and the electronic measuring/operating circuit are arranged in the housing chamber, wherein the electronic measuring/operating circuit is configured for operating the sensor and for processing a measuring signal output by the sensor and representing the measurand.

Field devices according to the invention can be used, for example, to measure the following: flow, fill-level, limit level, pressure, conductivity, pH, temperature.

In one embodiment, the device is a flow meter for measuring the flow rate or the volume or mass flow of a medium in a measuring tube according to one of the following measuring principles:

magnetic-inductive, thermal, ultrasound propagation time difference, ultrasound Doppler, Coriolis, vortex, pressure difference, wherein the device comprises the measuring tube for guiding the medium.

In one embodiment, the magnetic-inductive flow meter comprises a magnet system having at least one coil system for generating a magnetic field that is substantially perpendicular to a measuring tube axis;

at least one pair of measuring electrodes disposed in or on the measuring tube and electrically or capacitively coupled to the medium, wherein the pair of measuring electrodes are configured to sense a flow-dependent electrical voltage induced in the medium by the magnetic field;

wherein the magnet system and the measuring electrodes are electronically coupled to the measuring/operating circuit, wherein the measuring/operating circuit is configured to operate the magnet system and the measuring electrodes, and evaluate the electrical voltage representing the flow and sensed by the pair of measuring electrodes.

In one embodiment, the measuring/operating circuit is designed to apply at least two successive magnetic fields of alternating polarity to the medium for a flow measurement.

BRIEF DESCRIPTION OF THE DRAWING

The invention will now be described with reference to exemplary embodiments.

DETAILED DESCRIPTION

Figure 1:
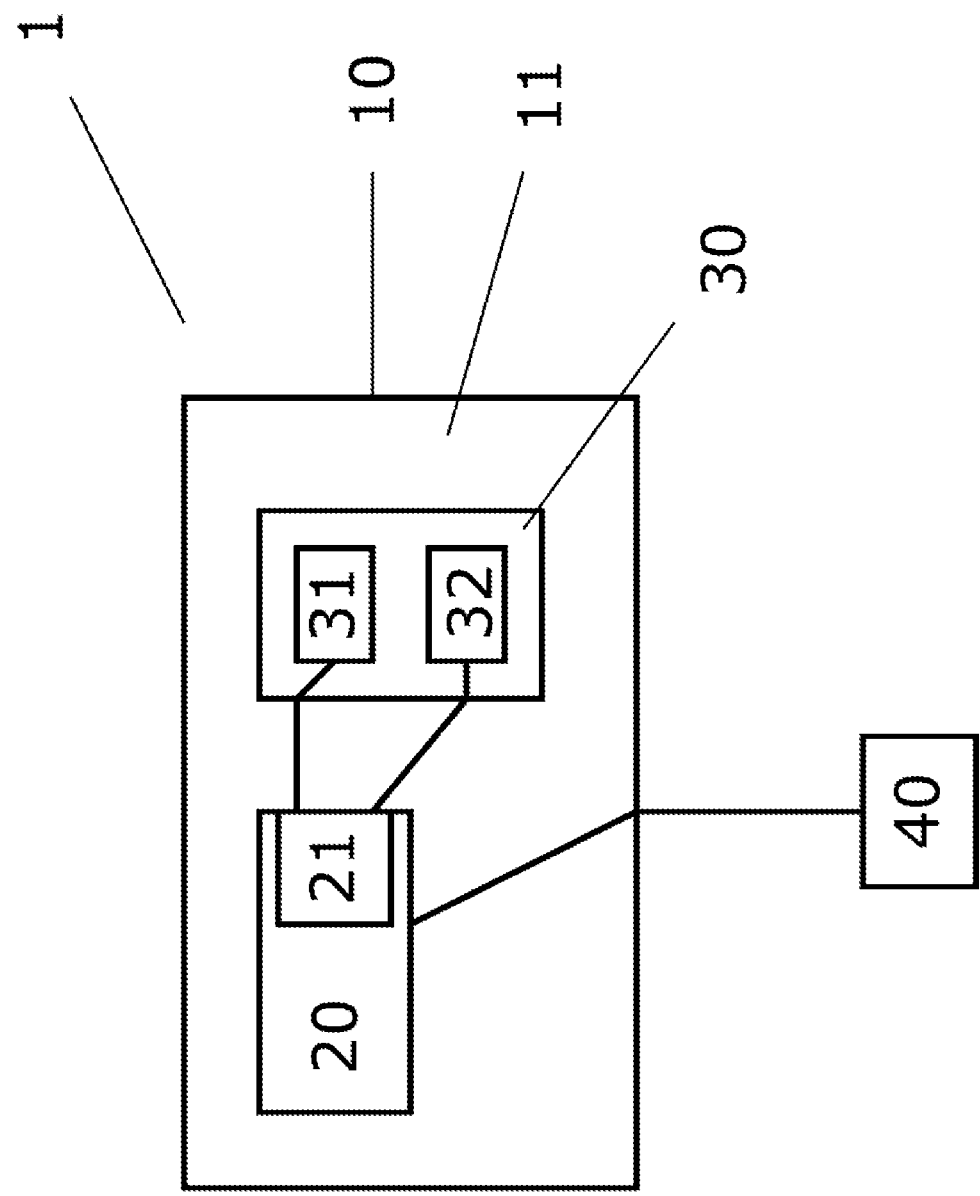
FIG. 1 sketches a schematic device with an energy store according to the present disclosure.

FIG. 1 sketches an exemplary device according to the invention comprising an energy store 30 according to the invention having a first storage unit 31 and a second storage unit 32; a housing 10 with a housing chamber 11; an electronic measuring/operating circuit 20 with a switch 21 and an electric load or sensor 40. The energy store 30 and the electronic measuring/operating circuit 20 are arranged in the housing chamber of the housing and are therefore protected against outside influences. The sensor 40 of the device is arranged outside of the housing. In an alternative embodiment, the electric load or sensor can also be arranged within the housing. The electronic measuring/operating circuit 20 is connected by electrical connections to the sensor 40 and to the energy store 30 or to the storage units of the energy store.

Figure 2:
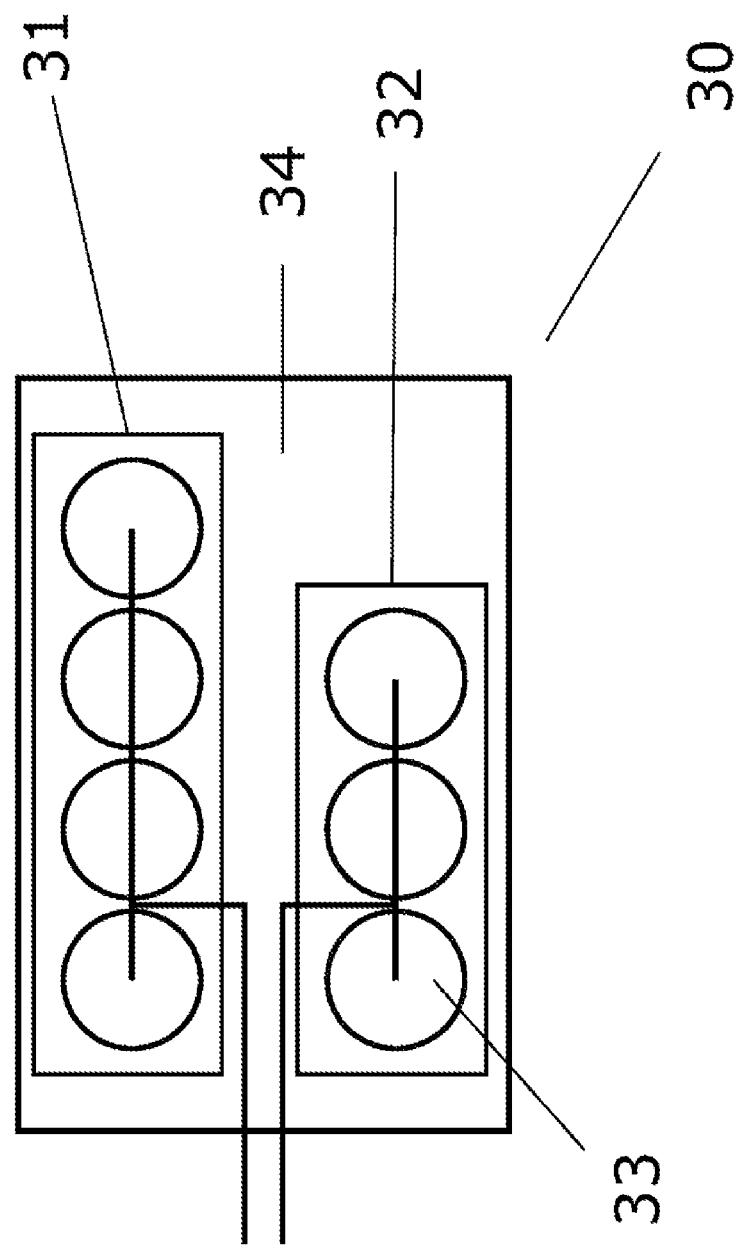
FIG. 2 sketches the construction of an exemplary embodiment of the energy store according to the present disclosure.

FIG. 2 sketches an exemplary energy store 30 according to the invention having a first storage unit 31 and a second storage unit 32, which storage units are spatially combined to form a storage module 34. The storage units are composed of storage elements 33, wherein the storage elements are accumulators or primary batteries, for example, wherein the primary batteries are preferably alkaline primary batteries and, in particular, lithium primary batteries. The storage elements 33 of the storage units are preferably of the same type. One type of storage unit has a rated energy quantity and a rated output voltage. In particular, one type is, further, an energy storage product of a specific manufacturer. And particularly preferably, one type is, further, an energy storage product of a manufacturer from a fabrication batch.

Storage elements 33 of a storage unit are characterized by an electrical combination, which is represented by a connecting line. The electrical combination can be provided by parallel and/or serial interconnection of the storage elements. Each storage unit can be connected to the electronic measuring/operating circuit via an electrical connection via the switch 21 of the electronic measuring/operating circuit. By establishing the connection between a storage element and the electronic measuring/operating circuit 20, it can be ensured that energy is supplied to the device 1. The spatial combination of the storage units into one module has the advantage that the storage elements are subject to similar environmental conditions, and their aging process thus runs similarly. This increases the stability of the energy store with regard to charging voltage and power output.

The sketched geometric arrangement of the storage units and of the storage elements 33 of the storage units and their number per storage unit is of a purely illustrative nature and is not to be taken as limiting the inventive idea. For example, the number of storage elements 33 per storage unit may be at least 1 and less than 10.

At initial startup of the device with a new, unused energy store, the first storage unit has a first initial energy quantity E1, and the second storage unit has a second initial energy quantity E2.

In one embodiment, an energy store according to the invention is not limited to a first storage unit and a second storage unit. An energy store can also comprise further storage units, which are actuated in accordance with the first or the second energy storage unit.

Figure 3:
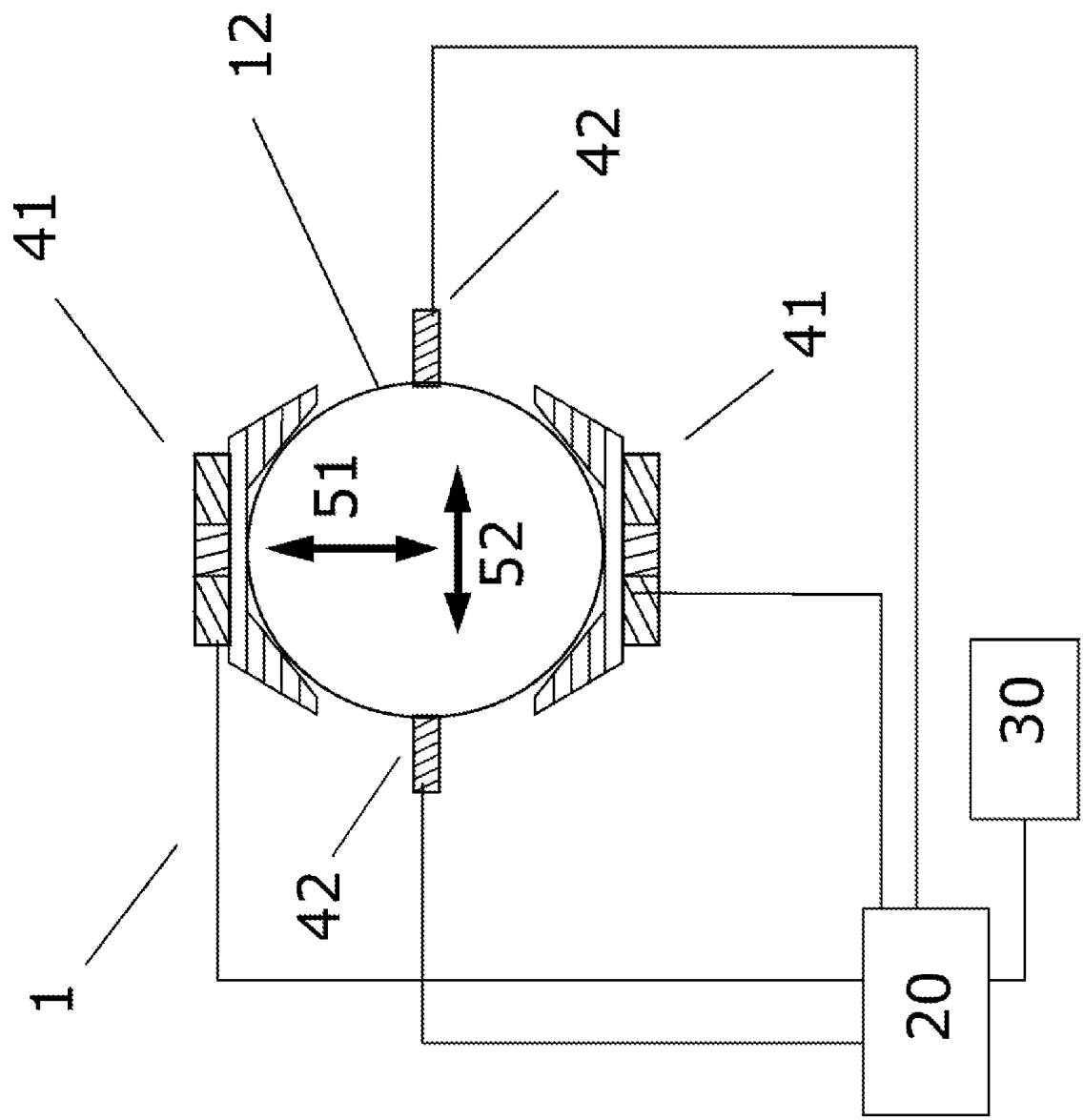
FIG. 3 shows a schematic cross-section through a magnetic-inductive flow meter according to the present disclosure with an energy store according to the present disclosure.

FIG. 3 sketches a cross-section through a magnetic-inductive flow meter comprising an energy store 30 according to the invention, wherein the magnetic-inductive flow meter further comprises: a measuring tube 12 for guiding a medium, a magnet system having two coil systems 42, a pair of measuring electrodes 42 and an electronic measuring/operating circuit 20 for operating the magnet system, the measuring electrodes 42, and for actuating the energy store 30. By applying a coil voltage to the coil systems 42, a magnetic field is generated which is essentially perpendicular to a measuring tube axis. In the medium flowing through the measuring tube 12, an electrical voltage, which is picked up by the measuring electrodes, is induced perpendicular to the magnetic field and perpendicular to the direction of flow, wherein the electrical voltage is dependent upon the flow of the medium and upon the magnetic field. The electronic measuring/operating circuit is designed to calculate flow measurement values on the basis of the measured electrical voltage. The energy store of a magnetic-inductive flow meter can, for example, have a total of two or three storage elements, wherein the capacitance of a storage element is between 50 Wh and 100 Wh, for example.

Figure 4:
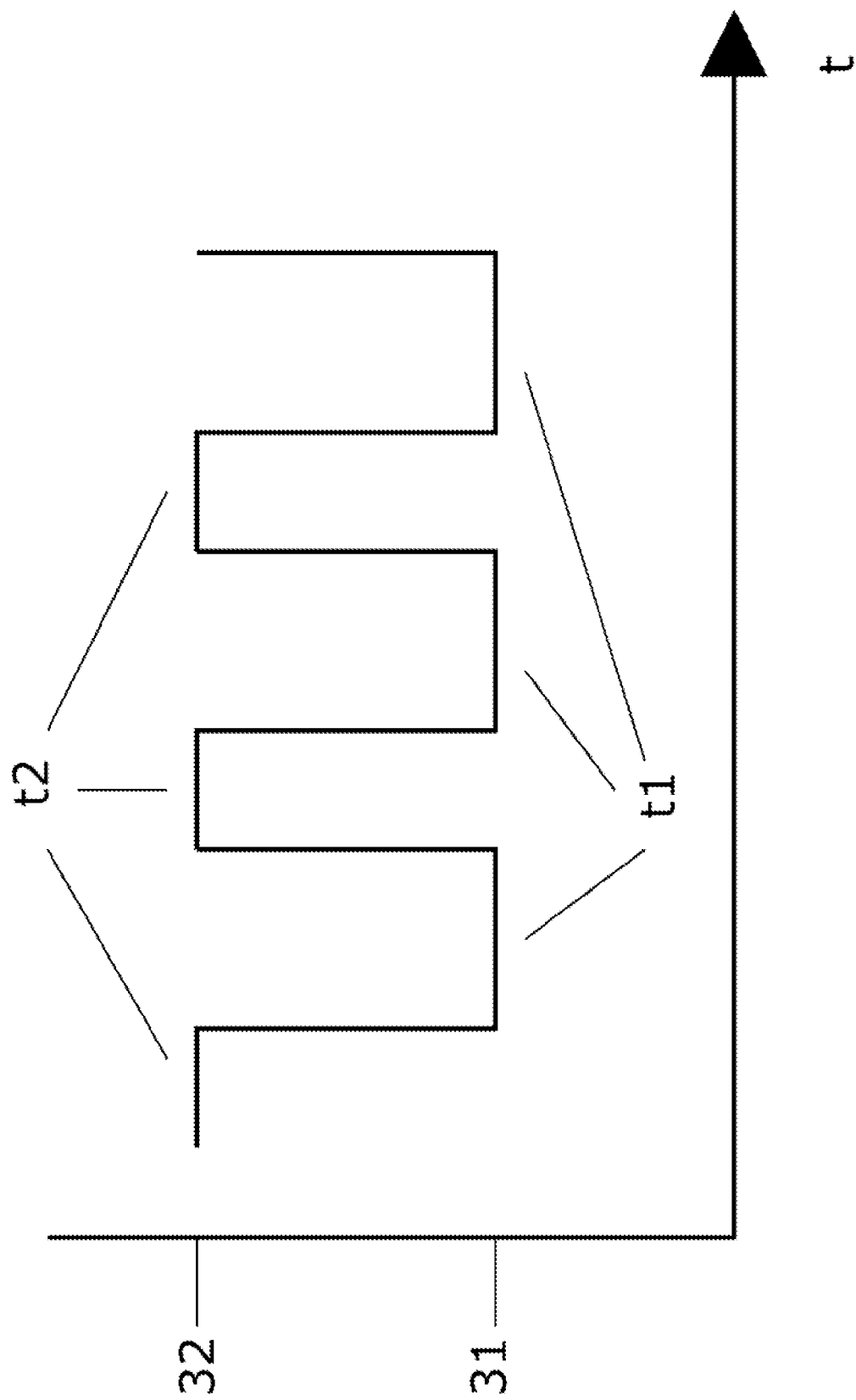
FIG. 4 shows a detail from an exemplary time curve according to the present disclosure of an actuation of a first storage unit and a second storage unit of an energy store according to the present disclosure.

FIG. 4 shows a section from a time curve of an actuation of the first storage unit 31 and the second storage unit 32, wherein the duration of an actuation of the first storage unit or second storage unit is a first time period t1 and a second time period t2, respectively. The ratio of the time periods shown in FIG. 4 is by way of example; for example, the time period t2 may also be greater than or equal to the time period t1.

In one embodiment, in which a first ratio V1=E1/E2 of the first initial energy quantity to the second initial energy quantity is greater than or equal to 1, and wherein, for a second ratio V2=t1/t2 of the first time period to the second time period, V2=V1*F applies, with either F being less than 1 and, in particular, less than 0.9 and preferably less than 0.8, or F being more than 1 and, in particular, more than 1.1 and preferably more than 1.2, it is ensured that the first storage unit and the second storage unit are actuated asymmetrically in such a way that either the first storage unit or the second storage unit is emptied first. With F more than 1, the first storage unit is emptied first, and with F less than 1, the second storage unit is emptied first.

In a further embodiment, in which a first ratio V1=E1/E2 of the first initial energy quantity to the second initial energy quantity is greater than or equal to 1, time periods of the actuation of the storage units may be variable and random, wherein the actuation of the first storage unit has an average first actuation time, and wherein the actuation of the second storage unit has an average second actuation time, wherein, for a third ratio V3 of the average first actuation time to the average second actuation time, V3=V1*F applies, with either F being less than 1 and, in particular, less than 0.9 and preferably less than 0.8, or F being more than 1 and, in particular, more than 1.1 and preferably more than 1.2.

This also ensures that the first storage unit and the second storage unit are actuated asymmetrically in such a way that either the first storage unit or the second storage unit is emptied first. With F more than 1, the first storage unit is emptied first, and with F less than 1, the second storage unit is emptied first.

Figure 5:
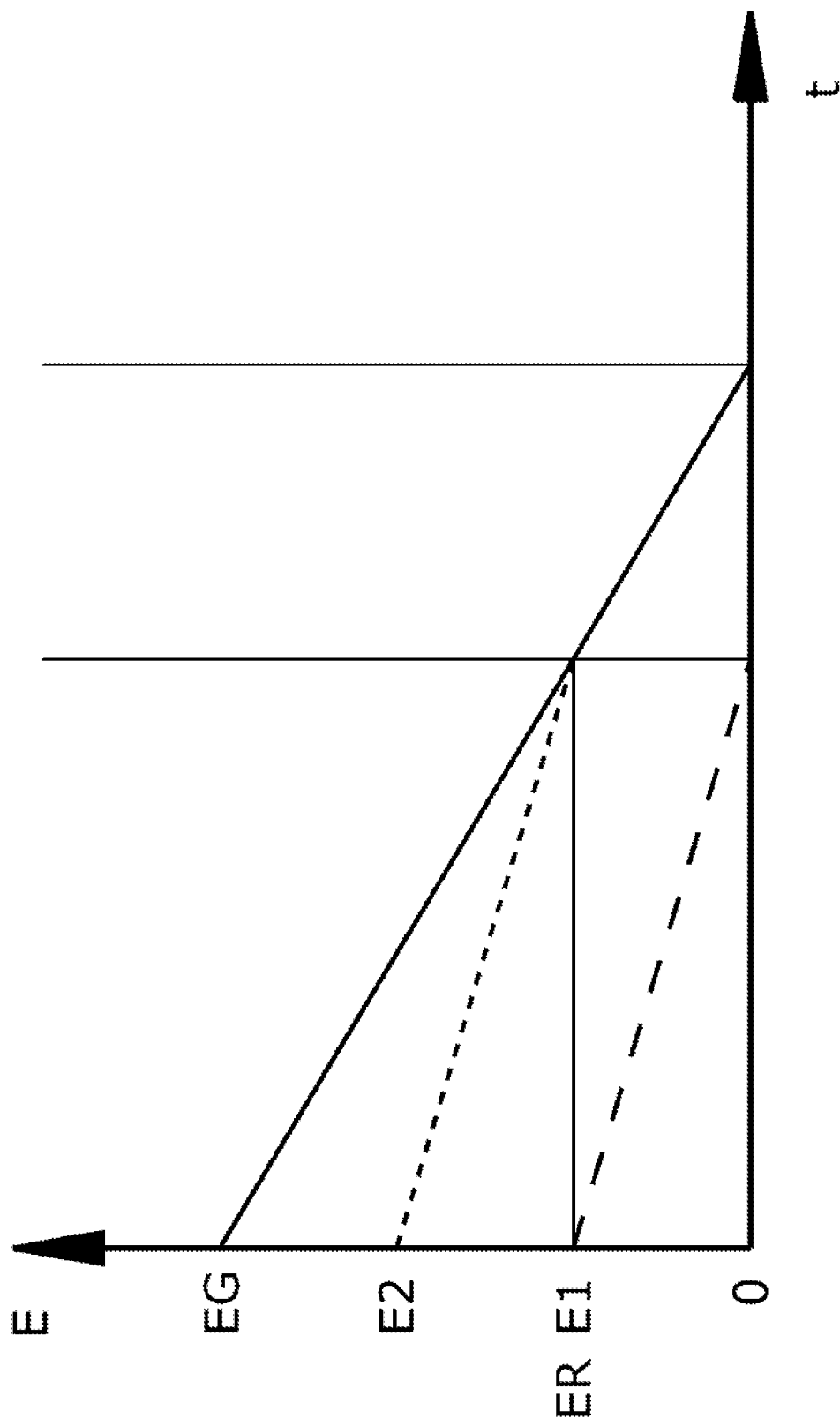
FIG. 5 describes an exemplary curve of a residual energy quantity of an energy store.

FIG. 5 sketches a schematic curve of the states of charge of an energy store according to the invention of a device, wherein the energy store has a first storage unit and a second storage unit, wherein the energy store has a total energy quantity EG at the beginning of its use, which is composed of a first initial energy quantity E1 of the first storage unit and of a second initial energy quantity E2 of the second storage unit, wherein EG=E1+E2. In a first phase, the first energy store and the second energy store are alternately loaded, so that an energy quantity of the first storage unit and an energy quantity of the second storage unit decrease until, as shown in this example, the first energy store is completely discharged, and the second energy store has a residual energy quantity ER. The device is then operated exclusively by the second energy store.

In one embodiment according to the invention, the first initial energy quantity E1 may also be greater than the second initial energy quantity E2. In one embodiment according to the invention, the second storage unit can be discharged before the first storage unit.

In this example, E2=2*E1 and EG=3*E1 apply. Furthermore, the first time period t1 is equal to the second time period t2. These values are chosen for illustrative purposes and are not to be construed as limiting the inventive idea. It should also be taken into account that the curves describing the state of charge of the storage units have kinks in real operation due to alternating discharging and non-discharging, which in this example are smoothed out. It is also not necessary for the curves to run in parallel until the first or second storage unit is discharged. The residual energy quantity ER is generally different from the first initial energy quantity E1.

The invention claimed is:

1. An electronic device, comprising:
at least one electric load;
at least one replaceable electric energy store; and
an electronic circuit for operating the electric load and for controlling power management of the electronic device;
wherein the energy store has at least one first storage unit with a first initial energy quantity and at least one second storage unit with a second initial energy quantity;
wherein the electronic circuit is designed to actuate the first storage unit or the second storage unit by means of a switch according to an algorithm, wherein energy is supplied to the electronic device by the respective storage unit by actuating the first storage unit or the second storage unit;
wherein the electronic circuit, by actuating the first storage unit or the second storage unit, determines whether the respective other storage unit has a residual energy quantity of at least 10% of a total energy quantity of the first initial energy quantity of the first storage unit and of the second initial energy quantity of the second storage unit;
wherein the electronic circuit generates a warning signal when the residual energy quantity, the first initial energy quantity, or the second initial energy quantity is below a predetermined threshold;
wherein the electronic circuit is configured to supply energy to the electronic device by using the respective other storage unit when the first initial energy quantity of the first storage unit or the second initial energy quantity of the second storage unit is below the predetermined threshold.

2. The electronic device of claim 1, wherein the energy store is one of: an accumulator; an alkaline primary battery; and a lithium primary battery.

3. The electronic device of claim 1, wherein the first storage unit and the second storage unit each include one or more storage elements of a same type.

4. The electronic device of claim 1, wherein the first storage unit and the second storage unit are combined spatially to form a storage module.

5. The electronic device of claim 1, wherein the algorithm includes at least one first time period for actuating the first storage unit and at least one second time period for actuating the second storage unit.

6. The electronic device of claim 5, wherein the first time period and the second time period are more than 100 milliseconds and less than 3 months.

7. The electronic device of claim 5, wherein the first time period and the second time period are more than 0.001% and less than 10% of a service life of the energy store.

8. The electronic device of claim 5, wherein a first ratio V1=E1/E2 of the first initial energy quantity E1 to the second initial energy quantity E2 is greater than or equal to 1;
wherein a second ratio V2=t1/t2 of the first time period t1 to the second time period t2 is V2=V1*F;
wherein F is less than 1 or more than 1;
wherein the electronic circuit is designed to actuate the first storage unit and the second storage unit alternately.

9. The electronic device of claim 5, wherein a first ratio V1=E1/E2 of the first initial energy quantity E1 to the second initial energy quantity E2 is greater than or equal to 1;
wherein the electronic circuit is designed to configure a sequence of actuation of the first storage unit and of the second storage unit randomly;
wherein the actuation of the first storage unit has an average first actuation time td1, and wherein the actuation of the second storage unit has an average second actuation time td2;
wherein a third ratio V3 of the average first actuation time td1 to the average second actuation time td2 is V3=V1*F;
wherein F is less than 1 or more than 1.

10. The electronic device of claim 1, wherein the electronic device is a field device for measurement and automation technology;
wherein the at least one electric load is a sensor for detecting at least one measurand;
wherein the electronic device also includes:

a housing having at least one housing chamber, wherein the energy store and the electronic circuit are arranged in the housing chamber;

wherein the electronic circuit is configured for operating the sensor and for processing a measurement signal which is output by the sensor and corresponds to the measurand.

11. The electronic device of any claim 1, wherein the device is a flow meter for measuring flow rate or volume or mass flow of a medium in a measuring tube according to one of the following measuring principles: magnetic-inductive, thermal, ultrasound propagation time difference, Coriolis, and vortex;

wherein the electronic device comprises the measuring tube for guiding the medium.

12. The electronic device of claim 11, wherein the magnetic-inductive flow meter comprises:

a magnet system having at least one coil system for generating a magnetic field which is perpendicular to a measuring tube axis; and at least one pair of measuring electrodes disposed in or on the measuring tube and electrically or capacitively coupled to the medium, wherein the pair of measuring electrodes are configured to sense a flow-dependent electrical voltage induced in the medium by the magnetic field;

wherein the magnet system and the measuring electrodes are electronically coupled to the electronic circuit;

wherein the electronic circuit is configured to operate the magnet system and the measuring electrodes and evaluate the electrical voltage representing flow sensed by the pair of measuring electrodes.

13. The electronic device of claim 12, wherein the electronic circuit is configured to apply at least two successive magnetic fields of alternating polarity to the medium for a flow measurement.

* * * * *